United States Patent [19]
Yamamoto et al.

[11] Patent Number: 5,677,944
[45] Date of Patent: Oct. 14, 1997

[54] CORDLESS TELEPHONE WITH BATTERY MEASURING SECTION

[75] Inventors: Ikuhiro Yamamoto, Kasuga; Kenichi Shibata, Fukuoka-ken, both of Japan

[73] Assignee: Matsushita Electric Industrial Co., Ltd., Osaka, Japan

[21] Appl. No.: 360,324

[22] Filed: Dec. 21, 1994

[30] Foreign Application Priority Data

Dec. 22, 1993 [JP] Japan .................... 5-324630

[51] Int. Cl.$^6$ .................... H04Q 7/20; H04Q 7/18
[52] U.S. Cl. .................... 379/61; 379/58; 455/38.3; 455/343; 320/20
[58] Field of Search .................... 379/58, 61; 320/20, 320/43, 44; 324/427; 455/38.3, 343

[56] References Cited

U.S. PATENT DOCUMENTS

| | | | |
|---|---|---|---|
| 4,884,294 | 11/1989 | Inagami | 379/61 |
| 4,992,720 | 2/1991 | Hata | 320/23 |
| 5,185,566 | 2/1993 | Goedken et al. | 320/20 X |
| 5,248,929 | 9/1993 | Burke | 320/43 X |
| 5,254,931 | 10/1993 | Martensson | 320/20 X |
| 5,325,041 | 6/1994 | Briggs | 320/44 |
| 5,333,179 | 7/1994 | Burke et al. | 379/58 |
| 5,541,491 | 7/1996 | Yamazaki | 320/22 |

FOREIGN PATENT DOCUMENTS

| | | |
|---|---|---|
| 3-60556 | 3/1991 | Japan . |
| 4-250756 | 9/1992 | Japan . |

*Primary Examiner*—Dwayne Bost
*Assistant Examiner*—Nay Maung
*Attorney, Agent, or Firm*—Spencer & Frank

[57] ABSTRACT

In a cordless telephone apparatus, a mobile set is provided with a remaining a battery amount measuring section which is incremented or decremented in accordance with a value corresponding to an operating condition of the mobile set and a value corresponding to a charging current set by a charging current change-over circuit. A full charge condition is detected on the basis of a value measured by the remaining battery amount measuring section, and this is used to control the charging current. Thereby, it becomes possible to operate the mobile set from the battery even in the course of charging, and to control the charging time and the charging current considering the electric power used for the operation of the mobile set. Since the charging time and the charging current are accurately adjusted in accordance with use conditions of the mobile set, it becomes possible to prevent over-charging and under-charging.

19 Claims, 7 Drawing Sheets

F I G. 1
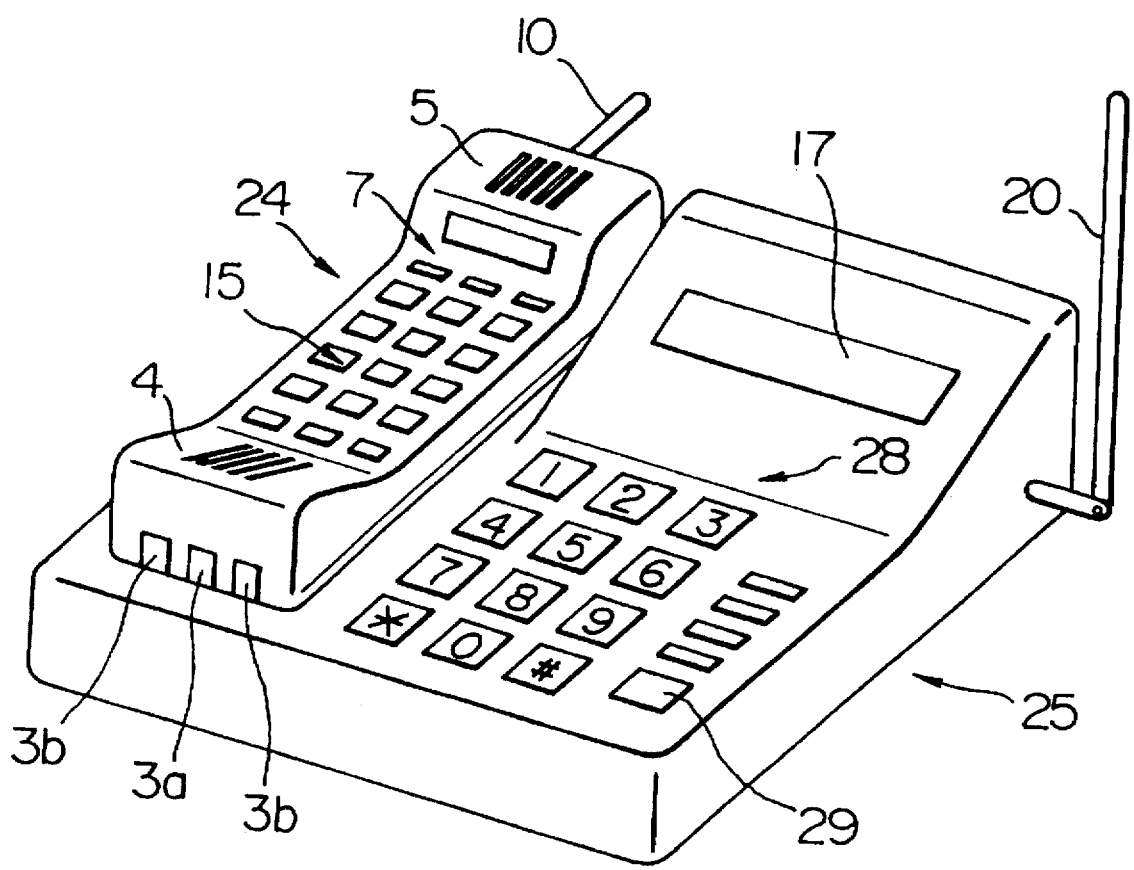

F I G. 3B
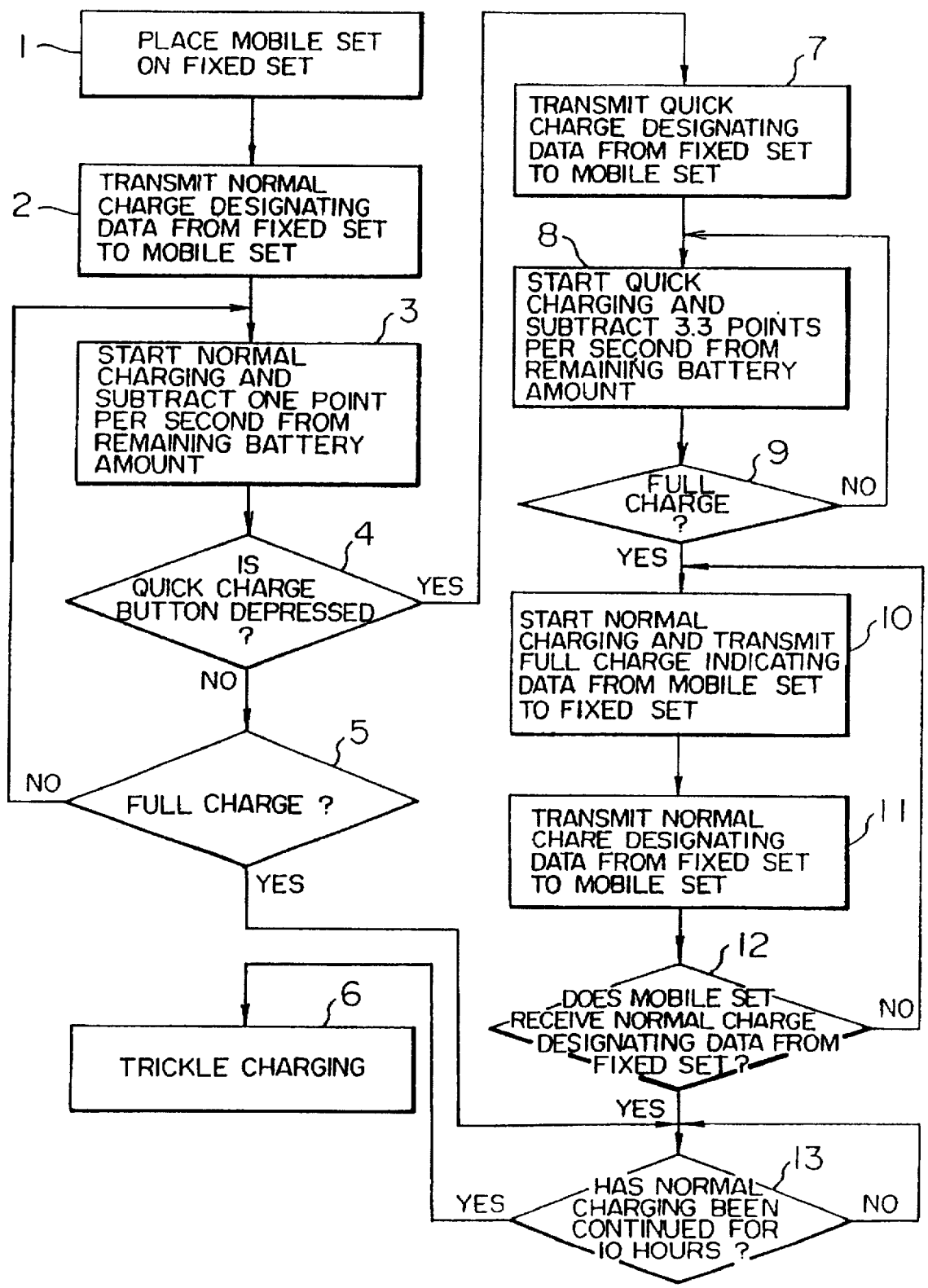

CORDLESS TELEPHONE WITH BATTERY MEASURING SECTION

BACKGROUND OF THE INVENTION

The present invention relates to a cordless telephone apparatus composed of a fixed set connected to a telephone line and a mobile set for making communication with the fixed set by radio, and also relates to a charging stand for a cordless telephone apparatus.

A rechargeable battery capable of being charged is frequently mounted in a mobile set. Usually, the rechargeable battery is charged by a charging circuit provided on the fixed set side when the mobile set is placed or hooked on the fixed set. There is a telephone apparatus provided with an over-charge preventing function for preventing over-charging when quick charging is performed for the mobile set.

The operation of the conventional cordless telephone apparatus at the time of charging will now be explained briefly.

For example, when a mobile set subjected to use for a long time is placed on a fixed set (or brought into an on-hook condition) for charging, a terminal voltage detecting circuit detects the reduction of the terminal voltage of a rechargeable battery in the mobile set. In response to this detection, a charging current controller increases the amount of charging current so that quick charging is effected for the rechargeable battery.

With such quick charging, the terminal voltage of the rechargeable battery can be increased up to a specified value in a short time. After the detection of a full charge state, an over-charge preventing function for preventing over-charging acts so that the charging current controller decreases the charging current amount to continue trickle charging.

However, with the above construction of the conventional cordless telephone apparatus, since the judgement as to a full charge state is made in such a manner that the terminal voltage detecting circuit detects the terminal voltage of the rechargeable battery, the judgement is subjected to the influence of unstable factors including variations in the rechargeable battery itself, the temperature environments and so forth. Also, for example, since current is consumed in the course of charging, the voltage of the rechargeable battery varies so that the judgement as to a full charge becomes difficult, thereby making it impossible to operate the mobile set in the course of charging. Further, there may also be a possibility that quick charging is finished before a full charge is reached or that quick charging is continued even after a full charge, thereby shortening the lifetime of the rechargeable battery.

SUMMARY OF THE INVENTION

The present invention has been made in light of the above-mentioned prior art and provides a cordless telephone apparatus comprising a fixed set and a mobile set; the fixed set including a radio transmitter and a radio receiver for the transmission/reception of a voice signal through a telephone line and also for the mobile set, and the mobile set including a radio receiver and a radio transmitter for making communication with the fixed set, in which the mobile set is provided with a remaining battery amount measuring section for measuring a remaining battery amount in a charging mode and in an operating condition and charging current control means for controlling a charging current by detecting a full charge condition on the basis of a value measured by the remaining battery amount measuring section.

Also, the present invention provides a charging stand comprising a power supply circuit for supplying a current for charging to a mobile set, in which the charging stand is provided with a quick charge button to be operated by a user and quick charge designating means for delivering quick charge designating data to the mobile set in accordance with the operation of the quick charge button.

With the above construction, the detection of a full charge is ensured, thereby making it possible to prevent over-charge or a shortage of charge.

BRIEF DESCRIPTION OF THE DRAWINGS

FIG. 1 is a schematic perspective view of a cordless telephone apparatus in an embodiment of the present invention;

FIGS. 3A and 3B are flow charts showing the operation of the cordless telephone apparatus in the first embodiment and modified first embodiment of the present invention at the time of charging;

DESCRIPTION OF THE PREFERRED EMBODIMENTS

Embodiments of the present invention will now be explained referring to the accompanying drawings. (Embodiment 1)

Figure 2:
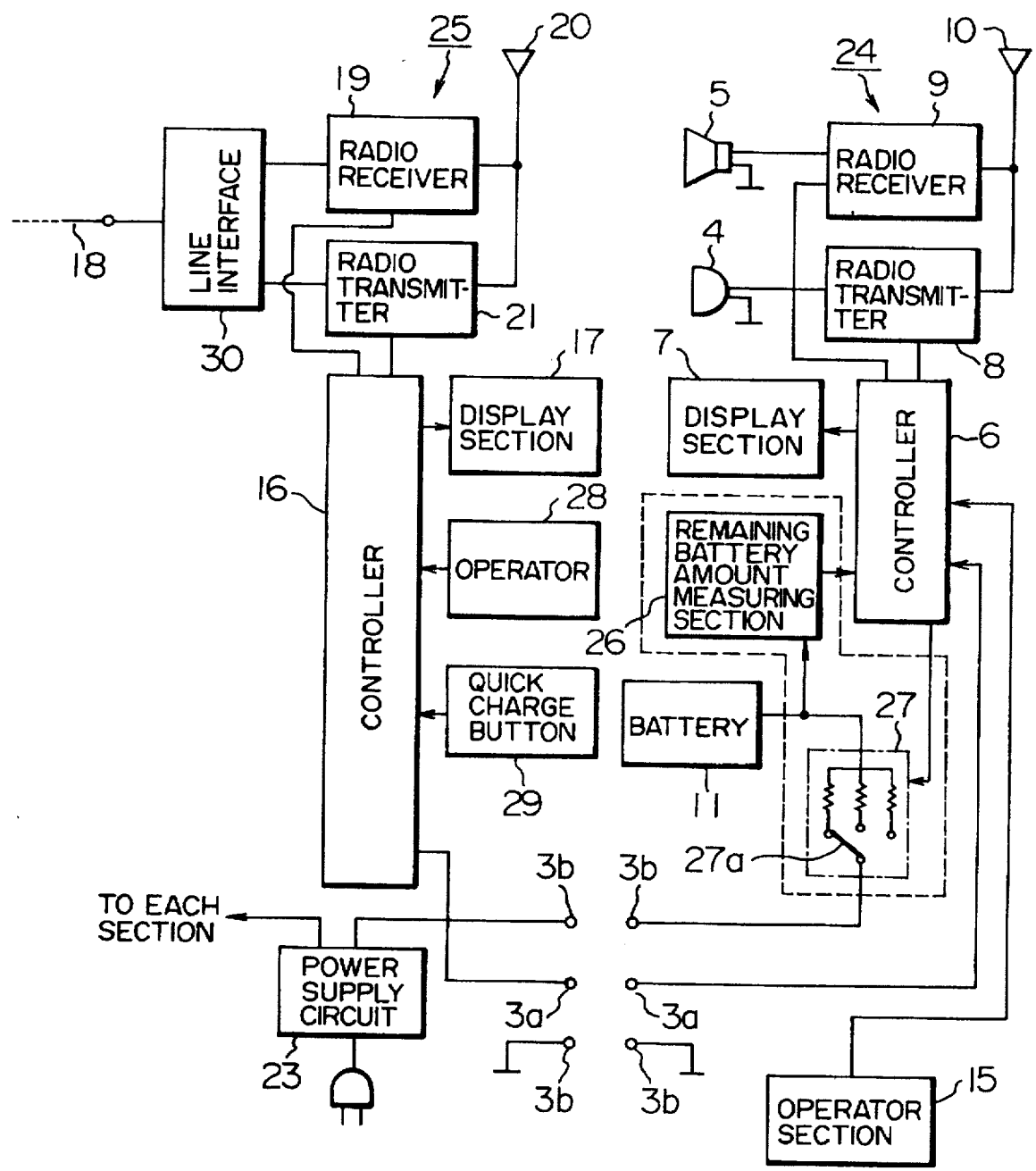
FIG. 2 is a block diagram showing the construction of a cordless telephone apparatus in a 5 first embodiment of the present invention.
Figure 3A:
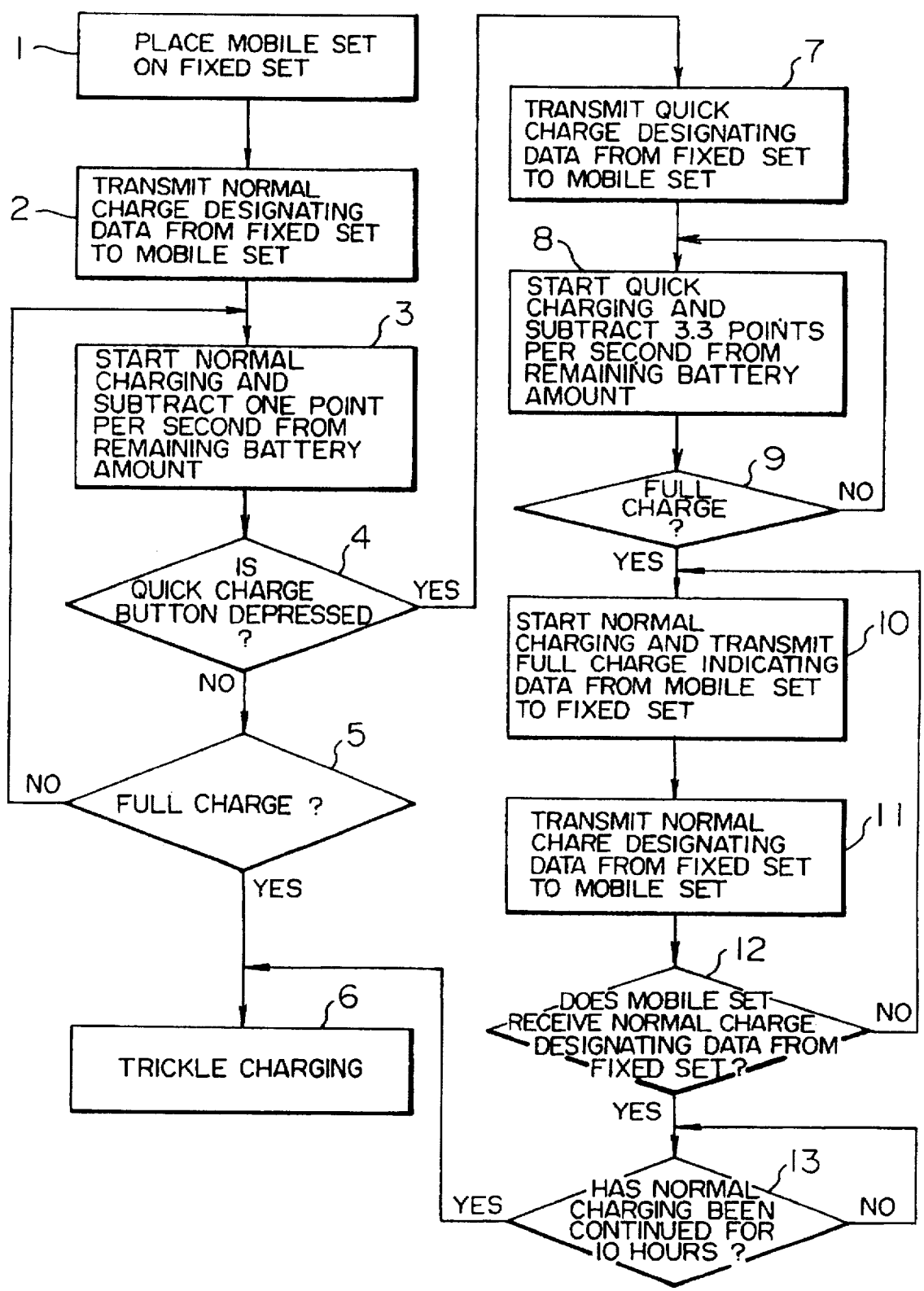

FIG. 1 is a schematic perspective view of a cordless telephone apparatus in an embodiment of the present invention, and FIG. 2 is a block diagram showing the construction of a cordless telephone apparatus according to a first embodiment of the present invention. FIG. 3 is a flow chart showing the operation of the cordless telephone apparatus in the embodiment of the present invention at the time of charging.

Referring to FIGS. 1 and 2, a cordless telephone apparatus is composed of one mobile set 24 and a fixed set 25. The mobile set 24 and the fixed set 25 are remotely communicatable with each other within a fixed distance (100 to 150 m). A base portion of the mobile set 24 (on this side in the drawing) is provided with three terminals which include a central terminal as a control terminal 3a and opposite side terminals as charging terminals 3b.

The mobile set 24 is of a so-called reversibly chargeable type. Namely, whichever of the obverse and reverse of the mobile set 24 is upward placed on the fixed set 25, the three terminals of the mobile set 24 are brought into electric connection with the corresponding terminals of the fixed set 25 to enable the charging of the mobile set 24. Therefore, in the case where the mobile set 24 is placed on the fixed set 25 with an operator section of the mobile set 24 being turned upward, as shown in FIG. 1, on-hook dialing through the operation of the mobile set 24 is possible even in course of charging.

First, an explanation will be presented of the mobile set 24 side. Reference numeral 4 denotes a telephone transmitter and numeral 5 denotes a telephone receiver. The transmitter 4 includes an electret condenser microphone, a dynamic microphone or the like. The receiver 5 includes a speaker or the like.

A controller 6 assuming the responsibility of the overall control of the mobile set 24 is composed of a CPU (central processing unit), a ROM (read only memory), a RAM (random access memory), a PIO (parallel input/output portion) and so forth. The controller 6 performs its control function at the time of telephoning and at the time of charging. The controller 6 also controls a display section 7 including liquid crystal, LEDs or the like, in order to perform the display of signal arrival, the display of a remaining battery amount and so forth.

Reference numeral 8 denotes a radio transmitter for transmitting a voice signal after conversion thereof into electric waves, numeral 9 denotes a radio receiver for receiving electric waves and deriving a voice signal through detection and demodulation, and numeral 10 denotes an antenna for making the transmission from the mobile set 24 to the fixed set 25 and the reception by the mobile set 24 from the fixed set 25. A helical antenna or the like is generally used as the antenna 10 in order to make the size small.

Numeral 11 denotes a rechargeable battery which acts as a power supply. Numeral 26 denotes a remaining battery amount measuring section for counting to assess the remaining battery amount of the rechargeable battery 11 in terms of a numeric value.

Numeral 27 denotes a charging current control section, which is enclosed by a broken line and assumes the responsibility of an over-charge preventing function. The amplitude of the charging current is adjusted by changing over the change-over switch 27a or changing over internal resistances. Numeral 15 denotes an operator section for performing operations such as dial input.

Next, an explanation will be presented of the fixed set 25 side. A controller 16 assuming the responsibility of the overall control of the fixed set 25 is composed of CPU, ROM, RAM, PIO and so forth. The controller 16 performs its control function at the time of telephoning and at the time of charging. The controller 16 also controls a display section 17 including liquid crystal, LEDs or the like, in order to visually indicate the arrival of a ring signal from a telephone line, whether the battery is in a full charge state and so forth. Reference numeral 18 denotes a telephone line. Numeral 19 denotes a radio receiver for receiving the communication from the mobile set 24 by an antenna 20 and sending it to the telephone line 18 after conversion into a voice signal.

Like the antenna 10, the antenna 20 is a helical antenna or the like. Numeral 21 denotes a radio transmitter for converting a voice signal from the telephone line 18 into electric waves and thereafter transmitting the electric waves to the mobile set 24 through the antenna 20. Numeral 28 denotes an operator section for performing operations such as dial input.

Numeral 29 denotes a quick charge button for changing over the charging mode from normal charging to quick charging. In order to perform quick charging, a power supply circuit 23 in the fixed set needs to be powerful enough for quick charging. If the mobile set 24 is placed on a charging stand or the like which lacks the ability for quick charging, quick charging is not effected. The quick charge button is not provided on the mobile set side in order to prevent a user from misunderstanding that the quick charging is possible in any case. Numeral 30 denotes a line interface having an interface function for connection to the telephone line 18 used for two-line/four line conversion, incoming call detection and impedance matching.

Like the mobile set 24, the fixed set 25 is provided with three terminals which include a central terminal as a control terminal 3a and opposite side terminals as charging terminals 3b. The charging terminal 3b is connected to the power supply circuit 23. When the charging terminal 3b of the fixed set 25 and the charging terminal 3b of the mobile set 24 are electrically connected to each other, the charging to the rechargeable battery 11 of the mobile set 24 from the fixed set 25 is effected.

The operation of the cordless telephone apparatus in the embodiment of the present invention having the above construction will be explained in conjunction with the operation at the time of charging with reference to FIGS. 1 to 3.

OUTLINE OF OPERATION

First, an outline of the operation at the time of charging will be presented.

When the mobile set 24 is placed on the fixed set 25 (or brought into an on-hook condition) for charging, a charging current is supplied from the fixed set 25. Usually, normal charging is automatically carried out. However, in the case where there is a need for quick charging, the user depresses the quick charge button 29 of the fixed set 25 to select the quick charging mode so that at the mobile set 24, the charging current is increased to be 3.3 times as large as that in the case of normal charging. Furthermore, a "measurement value" of the remaining battery amount measuring section 26 for counting to assess the remaining battery amount in terms of a numeric value is also increased so that it is 3.3 times as large as that in the case of normal charging.

The remaining battery amount measuring section 26 always digitizes the remaining battery amount of the rechargeable battery 11 by decreasing the remaining amount by one point per second in the case of normal charging and 3.3 points per second in the case of quick charging. The remaining battery amount of the rechargeable battery 11 is controlled with full replacement by numeric values of 36,864 points between "0000" (full charge) and "9000" (discharge) irrespective of the charging mode. If the remaining battery amount comes to "0000", the judgement of a full charge state is made.

When a full charge is assumed, the mobile set 24 transmits this information to the fixed set 25 by radio. In accordance therewith, the fixed set 25 flickers a full charge indicating lamp or LED in the display section 17 to indicate full charge. Immediately after this, the over-charge preventing function for preventing over-charging acts so that the controller 6 operates the charging current change-over switch 27 to change over the charging current to that in the case of normal charging, thereby preventing overcharging. After the normal charging has been carried out for ten hours, a change-over to trickle charging to the extent of replenishment of spontaneous discharge of the rechargeable battery 11 is made to continue the charging.

DETAILS OF OPERATION

Next, an explanation will be presented of the details of the operation at the time of charging.

For example, if the mobile set 24 is used for a long time, a need-of-charge indicating lamp or LED in the display section 7 of the mobile set-24 flickers. When the mobile set 24 is placed on the fixed set 25 (or brought into an on-hook condition) for charging (step 1), the fixed set 25 transmits normal charge designating data to the mobile set 24 through the control terminal 3a (step 2).

When the fixed set 25 initiates normal charging for the mobile set 24, the remaining battery amount measuring section 26 of the mobile set 24 sets the "measurement value" for the count of the remaining battery amount in terms of a numeric value to one point and a numeric value representative of the remaining battery amount is decreased by one point per second (step 3). The subsequent flow branches in accordance with whether or not a quick charge button 29 is depressed (step 4).

The remaining battery amount measuring section 26 always controls the remaining battery amount of the rechargeable battery 11 by use of numeric values between "0000" (full charge) and "9000" (discharge) in a 16-bit form so that the remaining amount is decreased by one point per second in the case of normal charging and 3.3 points per second in the case of quick charging. The remaining battery amount is thus digitized. Namely, in the of case of quick charging, the "measurement value" per second is increased so that it is 3.3 times as large as that in the case of normal charging, thereby making the current amount per point identical to that in the case of normal charging.

The remaining battery amount of the rechargeable battery 11 is controlled with full replacement by numeric values of 36,864 points between "0000" (full charge) and "9000" (discharge) irrespective of the charging mode. If the remaining battery amount comes to "0000", the judgement of a full charge state is made. In this connection, the time required until the change of the remaining battery amount from "9000" (discharge) to "0000" (full charge) is ten hours in the case of normal charging and three hours in the case of quick charging.

Unless the user depresses the quick charge button 29, the normal charging is continued until full charge is assumed (step 5). In the case where the full charge is assumed, a change-over to trickle charging to the extent of replenishment of spontaneous discharge of the rechargeable battery 11 is made to continue the charging (step 6).

If the user depresses the quick charge button 29 in the case where there is a need for quick charging, data designating quick charging is transmitted from the fixed set 25 through the control terminal 3a and a quick charge indicating lamp or LED in the display section 17 of the mobile set 24 is illuminated (step 7). Receiving the quick charge designating data from the fixed set 25, the mobile set 24 immediately changes over the charging current control section 27 to increase the charging current by 3.3 times as large as that in the case of normal charging, thereby starting quick charging.

When the quick charging is started, the remaining battery amount measuring section 26 of the mobile set 24 sets the "measurement value" for the count of the remaining battery amount in terms of a numeric value to 3.3 points and a numeric value representative of the remaining battery amount is decreased by 3.3 points per second (step 8). The quick charging is continued until a full charge is assumed. If the full charge is assumed (step 9), the flow proceeds the next step.

If the full charge is assumed, that is, if the remaining battery amount of the rechargeable battery counted by the remaining battery amount measuring section 26 comes to "0000~", an over-charge preventing function for preventing over-charge immediately acts so that the charging current control section 27 is changed over to set the charging current to that in the case of normal charging and data indicative of a full charge state is transmitted from the mobile set 24 to the fixed set 25 by radio (step 10). The mobile set 24 continues the transmission of the full charge indicating data by way of precaution until data designating normal charging is received from the fixed set 25.

When receiving the full charge indicating data, the fixed set 25 changes the quick discharge indicating lamp or LED in the display section 17 of the fixed set 25 from the lit condition to a flickering condition to indicate the full charge and transmits the normal charge designating data to the mobile set 24 through the control terminal 3a (step 11).

Until the normal charge designating data is received from the fixed set 25, the mobile set 24 returns to step 10 to continue the transmission of the full charge indicating data to the fixed set 25 (step 12).

In normal charging, the "measurement value" for the count of the remaining battery amount in terms of a numeric value is set to one point. Accordingly, in this state, one point per second is subtracted from the numeric value representative of the remaining battery amount. The normal charging is continued for ten hours and is completed when ten hours has elapsed (step 13). After the numeric value of the remaining battery amount counted by the remaining battery amount measuring section 26 has come to "0000", the value does not change from "0000" (step 13).

Thereafter, a change-over to trickle charging to the extent of replenishment of spontaneous discharge of the rechargeable battery 11 is made to continue the trickle charging (step 6).

FIG. 3B is a flow chart showing the operation of a modification of the first embodiment. As shown in FIG. 3B, it is not changed to the trickle charging immediately when a full charge state is detected during normal charging. In step 13, a check is made to determine whether 10 hours have elapsed from the beginning of normal charging. If 10 hours have not elapsed, the normal charging is continued, and when 10 hours have elapsed, it is changed to the trickle charging.

The foregoing explanation has been presented based on the premise that the mobile set 24 is not used in the course of charging. In the cordless telephone apparatus of the present embodiment, however, on-hook dialing is possible, as has been mentioned earlier. This is so even in the course of charging. In the case where on-hook dialing is conducted using the mobile set 24 in the course of charging, the "measurement value" of the remaining battery amount counted by the remaining battery amount measuring section 26 in terms of a numeric value is one point, but one point corresponding to the use of the mobile set 24 is added since the remaining battery amount is decreased due to the use of the mobile set 24. That is, regarding the "measurement value" when the mobile set 24 is in use, the point shown in step 3 is +1 and −1, or 0. In the case where the mobile set 24 is used in course of quick charging, not 3.3 points, but 2.3 points are subtracted in step 8.

As has been mentioned in the foregoing explanation, the remaining battery amount measuring section 26 is provided on the mobile set 24 side so that the remaining battery amount of the rechargeable battery 11 is counted in accordance with the charging mode or the operating condition of the mobile set 24 (or whether or not on-hook dialing is conducted). Thereby, the detection of a full charge state becomes sure. As a result, it is possible to prevent over-charge and a shortage of charging.

In the following, other embodiments of the present invention will be explained.

EMBODIMENT 2

In the explanation of the embodiment 1, charging is carried out after the transmission/reception of various data such as normal charging and quick charging by the mobile set 24 and the fixed set 25. Therefore, charging of the mobile set 24 is possible only on the fixed set 25.

However, the placement of the mobile set 24 onto the fixed set 25 can easily be detected in the mobile set 24 from a charging current supplied to the rechargeable battery 11. Accordingly, there may be employed a construction or embodiment in which the charging current supplied to the rechargeable battery 11 is detected in the mobile set 24 and the mobile set 24 automatically controls the start of charging in accordance with the detection output.

Figure 4:
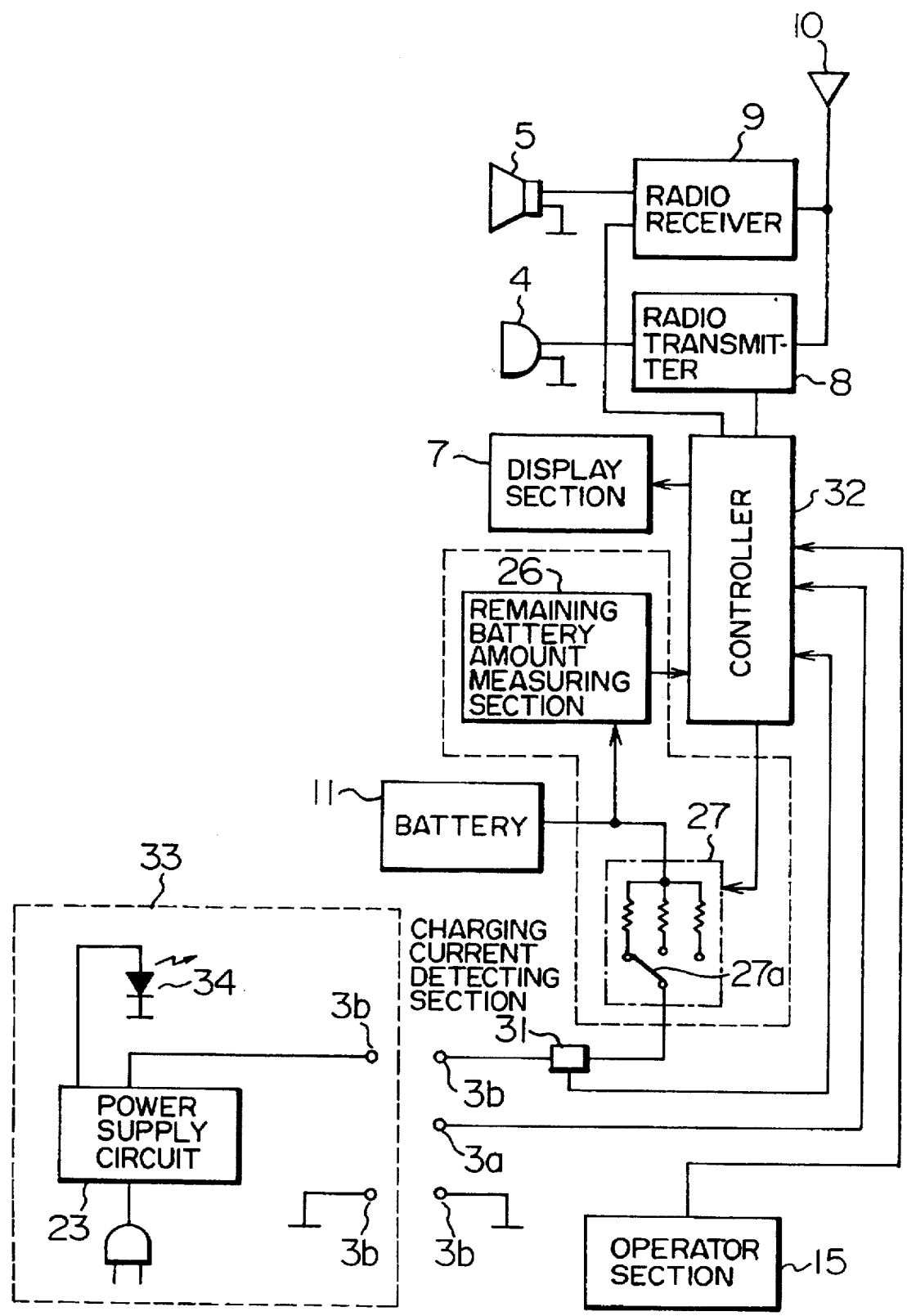
FIG. 4 is a block diagram showing the construction of a mobile set and a charging stand of a cordless telephone apparatus in a second embodiment of the present invention.

FIG. 4 shows the mobile set 24 in such an embodiment. In FIG. 4, reference numeral 31 denotes a charging current detecting section for detecting the supply of a charging current to a rechargeable battery 11. A controller 32 is provided with normal charge control means for controlling a charging current change-over switch 27 in accordance with the detection output of the charging current detecting section 31 to effect normal charging.

In the embodiment 1, the charging is started in accordance with normal charging start designating data sent from the fixed set 25 when the mobile set 24 is placed on the fixed set 25. With this construction, however, charging is possible only by a fixed set provided with the function of delivering the normal charging start designating data. On the other hand, with the construction of the present embodiment, in which the charging start control is automatically performed in the mobile set 24, it is not necessary to receive the designation of a charging start from the exterior. Accordingly, normal charging becomes possible from a charging stand 33 consisting of a power supply circuit 23 as shown in FIG. 23. Reference numeral 34 denotes an LED element for indicating that the mobile set 24 is in the course of charging. The LED element 34 is lit when normal charging is being carried out.

The above will further be explained with reference to the flow chart shown in FIG. 3. Step 2 is omitted. Though the flow of quick charging (reaching step 6 through step 1, step 4, step 7 and step 13) is operative only in the case where there is a designation of quick charging from the fixed set 25, the flow of normal charging (reaching steps 6 through steps 1 to 5) needs no designation of charging from the fixed set 25. Namely, with such a construction, normal charging becomes possible even with a charging stand 33 including only the power supply circuit 23, and having no quick charging capability, is used.

EMBODIMENT 3

Figure 5:
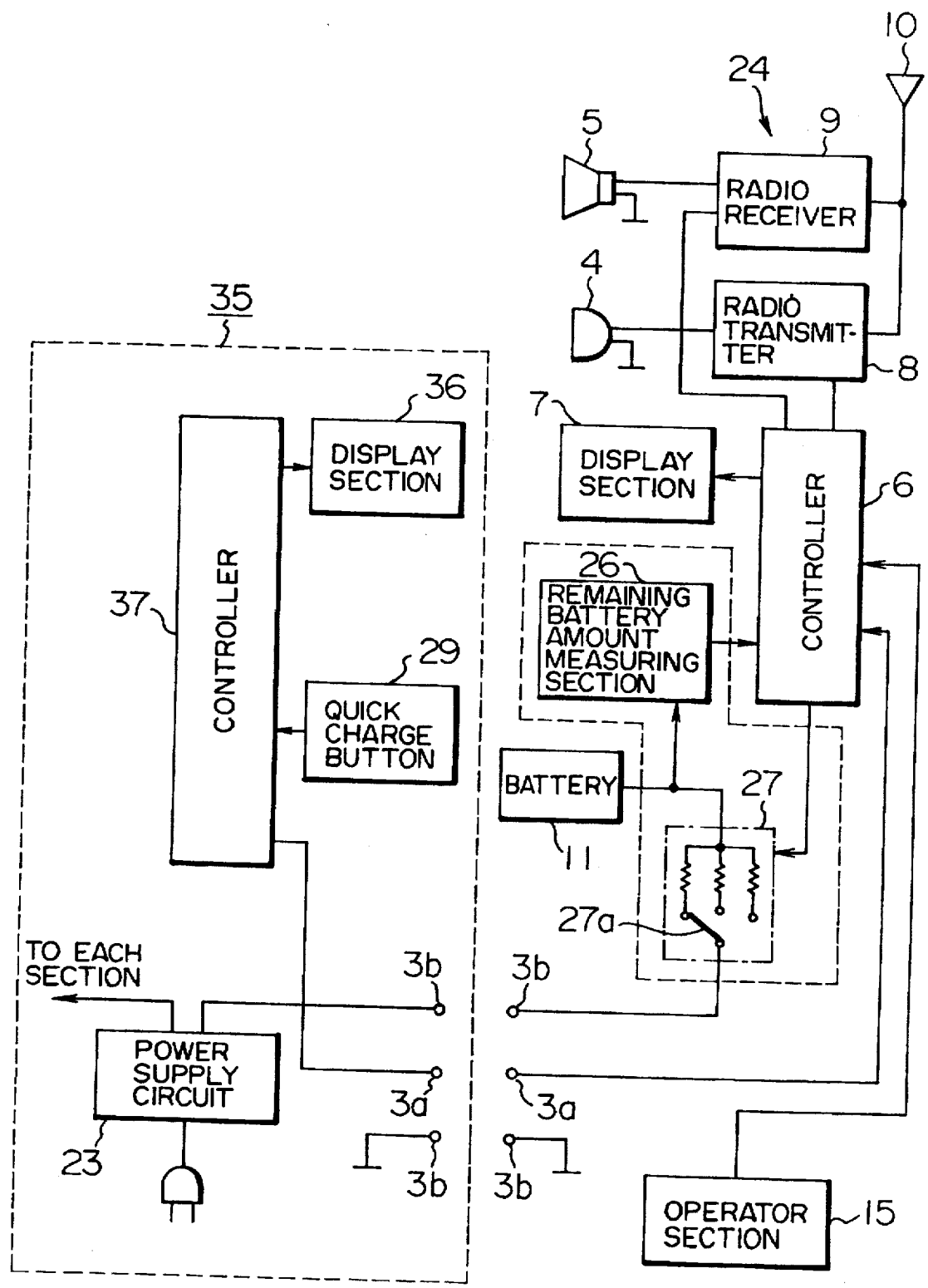
FIG. 5 is a block diagram showing the construction of a charging stand and a mobile set of a cordless telephone apparatus in a third embodiment of the present invention.
Figure 6:
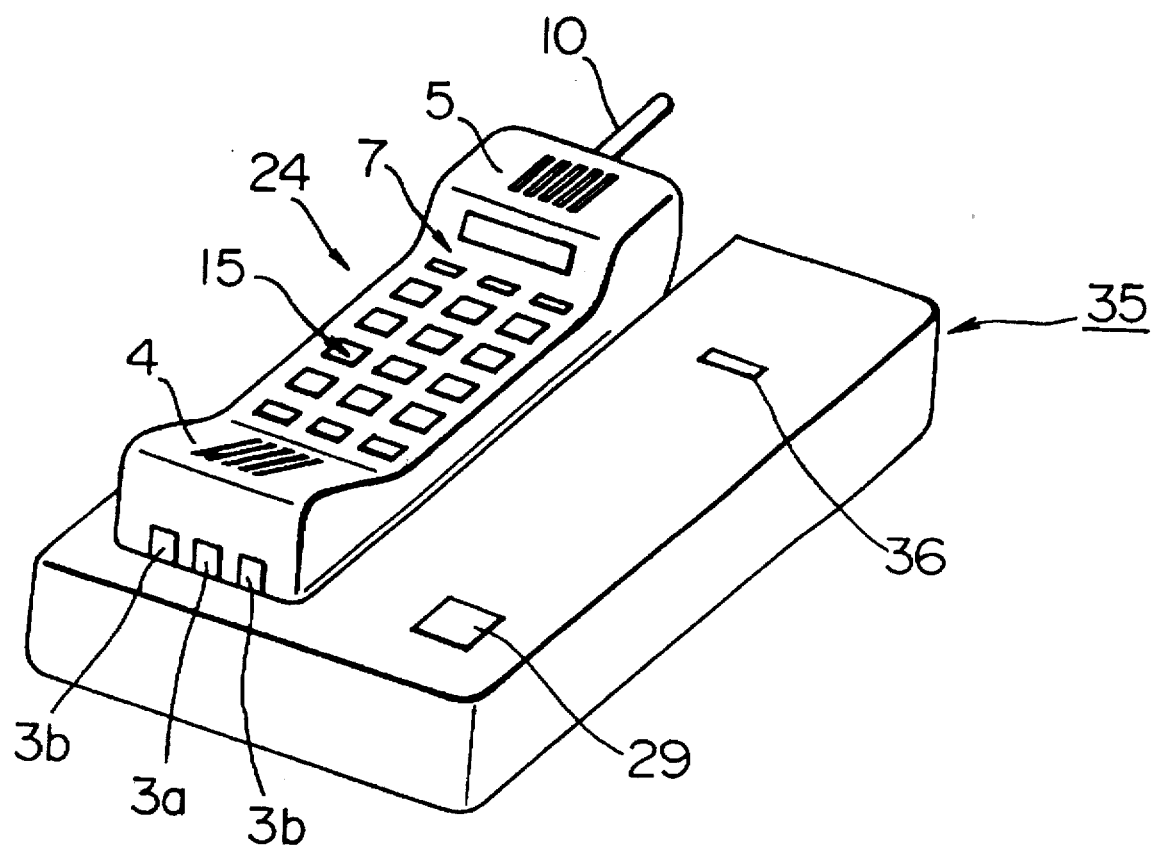
FIG. 6 is a schematic perspective view showing the construction of the charging stand and the mobile set of the cordless telephone apparatus in the third embodiment of the present invention.

If a charging stand capable of transmitting quick charge designating data to the mobile set 24 as in the fixed set 25 in the embodiment 1 is constructed, quick charging becomes possible without using the fixed set 25. FIGS. 5 and 6 show such a charging stand. Reference numeral 35 denotes a charging stand of the present embodiment which includes a quick charge button 29 and a display section 36 for displaying information that the mobile set 24 is in the course of quick charging. In a manner similar to that in the case of the embodiment 1, a controller 37 delivers quick charge designating data to the mobile set 24 through a control terminal 3a when the quick charge button 29 is depressed by a user.

At the mobile set 24, a charging current control section 27 is controlled in accordance with the quick charge designating data to effect quick charging. It is needless to say that in this case too, a change-over from quick charging to normal charging is made on the mobile set 24 side if the charge state of a rechargeable battery 11 comes to full charge.

EMBODIMENT 4

In the foregoing embodiments, the quick charging at the mobile set 24 is started by depressing the quick charge button 29 of the fixed set 25 or the charging stand 35. However, the quick charge button 29 can be omitted if quick charging is automatically started in response to the detection of placement of the mobile set 24 onto the fixed set 25. Namely, for example, the charging current detecting section 31 as shown in FIG. 4 for detecting the supply of a charging current to the rechargeable battery 11 is provided and the controller is provided with control means for controlling the charging current control section 27 in accordance with the detection output from the charging current detecting section 31 to effect quick charging. It is needless to say that in this case too, the quick charging is continued in a manner similar to that in the foregoing embodiments until the charge state of the rechargeable battery 11 comes to full charge and a change-over from quick charging to normal charging is made if the full charge is assumed.

We claim:

1. A cordless telephone apparatus, comprising:

a fixed set which includes a power supply, means for transmitting and receiving a voice signal through a telephone line, a quick charge button actuable by a user, and quick charge control means responsive to actuation of the quick charge button for emitting quick charge designation data;

a mobile set which includes means for conducting radio communication with the fixed set, a rechargeable battery which is supplied with a normal charge current from the power supply of the fixed set when the mobile set is placed on the fixed set, and remaining battery amount measuring means for converting a remaining amount of charge in the rechargeable battery into a numerical value and for altering the converted value by counting to change the converted value to a predetermined full charge value, with the converted value being changed by a predetermined measurement value per unit of time;

charge current change means in one of the sets for changing the charge current that is supplied to the rechargeable battery; and charge current control means in said one of the sets for controlling the charge current change means, the charge current control means being operative to cause the charge current change means to supply a quick charge current to the rechargeable battery in lieu of the normal charge current if the quick charge button of the fixed set has been actuated to emit the quick charge designation data, and to cause the charge current change means to return the charge current to the normal charge current when the remaining battery amount measuring means reaches the predetermined full charge value.

2. The cordless telephone apparatus of claim 1, wherein the charge current change means and the charge current control means are included in the mobile set, and wherein the charge current control means further comprises means for sending full charge data by radio to the fixed set when the remaining battery amount measuring means reaches the predetermined full charge value and the charge current has been returned to the normal charge current.

3. The cordless telephone apparatus of claim 1, wherein the remaining battery amount measuring means changes the converted value to the predetermined full charge value by counting the converted value down to the predetermined full charge value.

4. The cordless telephone apparatus of claim 1, wherein the charge current control means further comprises means for controlling the charge current change means to reduce the charge current from the normal charge current to a trickle charge current a predetermined time after the remaining battery amount measuring means reaches the predetermined full charge value.

5. The cordless telephone apparatus of claim 1, wherein the charge current change means and the charge current control means are included in the mobile set.

6. A cordless telephone apparatus, comprising:

a fixed set which includes means for transmitting and receiving a voice signal through a telephone line;

a charging stand which includes a power supply; and a mobile set which includes means for conducting radio communication with the fixed set, a rechargeable battery which is supplied with charge current from the power supply of the charging stand when the mobile set is placed on the charging stand, charge current detection means for detecting the charge current to the rechargeable battery, and remaining battery amount measuring means for converting a remaining amount of charge in the rechargeable battery into a numerical value and for altering the converted value by counting to change the converted value to a predetermined full charge value, with the converted value being changed by a predetermined measurement amount per unit of time;

charge current change means for changing the charge current that is supplied to the rechargeable battery; and charge current control means for controlling the charge current change means so that the charge current to the rechargeable battery is set at a normal charge current when the charge current detection means detects the charge current to the rechargeable battery and so that the normal charge current is reduced to a trickle charge current when the remaining amount battery measuring means reaches the full charge value.

7. The cordless telephone apparatus of claim 6, wherein the remaining battery amount measuring means changes the converted value to the predetermined full charge value by counting the converted value down to the predetermined full charge value.

8. The cordless telephone apparatus of claim 6, wherein the charge current change means and the charge current control means are included in the mobile set.

9. A cordless telephone apparatus, comprising:

a fixed set which includes means for transmitting and receiving a voice signal through a telephone line;

a charging stand which includes a power supply, a quick charge button actuable by a user, and quick charge control means responsive to actuation of the quick charge button for emitting quick charge designation data;

a mobile set which includes means for conducting radio communication with the fixed set, a rechargeable battery which is supplied with a normal charge current from the power supply of the charging stand when the mobile set is placed on the charging stand, and remaining battery amount measuring means for converting a remaining amount of charge in the rechargeable battery into a numerical value and for altering the converted value by counting to change the converted value to a predetermined full charge value, with the converted value being changed by a predetermined measurement value per unit of time;

charge current change means for changing the charge current that is supplied to the rechargeable battery; and charge current control means for controlling the charge current change means, the charge current control means being operative to cause the charge current change means to supply a quick charge current to the rechargeable battery in lieu of the normal charge current if the quick charge button of the charging stand has been actuated to emit the quick charge designation data, and to cause the charge current change means to return the charge current to the normal charge current when the remaining battery amount measuring means reaches the predetermined full charge value.

10. The cordless telephone apparatus of claim 9, wherein the remaining battery amount measuring means changes the converted value to the predetermined full charge value by counting the converted value down to the predetermined full charge value.

11. The cordless telephone apparatus of claim 9, wherein the charge current control means further comprises means for controlling the charge current change means to reduce the charge current from the normal charge current to a trickle charge current a predetermined time after the remaining battery amount measuring means reaches the predetermined full charge value.

12. The cordless telephone apparatus of claim 9, wherein the charge current change means and the charge current control means are included in the mobile set.

13. A cordless appliance for use with a charging stand having a power supply, comprising:

a housing;

a rechargeable battery in the housing, the rechargeable battery being rechargeable by the power supply of the charging stand;

operational means, carried by the housing, for performing a predetermined function of the appliance while consuming power from the rechargeable battery;

remaining battery amount measuring means, in the housing, for holding a counting value which ranges between a predetermined maximum value and a predetermined minimum value, the counting value being counted toward one of the maximum and minimum values when the operational means receives power from the rechargeable battery and being counted toward the other of the maximum and minimum values when the rechargeable battery receives current from the power supply of the charging stand;

a manually operable quick charge button; and means for supplying current from the power supply to the rechargeable battery at a first current magnitude until the counting value reaches said other of the maximum and minimum values if the quick charge button has been actuated and for supplying current from the power supply to the rechargeable battery at a second current magnitude until the counting value reaches said other of the maximum and minimum values if the quick charge button has not been actuated, the counting value being counted toward said other of the maximum and minimum values at a first rate if the quick charge button has been actuated and being counted toward said other of the maximum and minimum values at a second rate if the quick charge button has not been actuated, the first current magnitude and the first rate being larger respectively than the second current magnitude and the second rate.

14. The cordless appliance of claim 13, wherein the appliance is a mobile telephone set and the operational means includes a radio transmitter and a radio receiver.

15. The cordless appliance of claim 13, wherein the maximum value corresponds to a discharged state of the rechargeable battery and the minimum value corresponds to a charged state of the rechargeable battery, and wherein the counting value is incremented when the operational means receives power from the rechargeable battery and decremented when the rechargeable battery receives current from the power supply of the charging stand.

16. The cordless appliance of claim 15, wherein the minimum value is zero, and further comprising means for supplying current from the power supply to the rechargeable battery at one of the first and second current magnitudes until the counting value reaches zero and for supplying current from the power supply to the rechargeable battery at the second current magnitude for a predetermined period of time after the counting value reaches zero, the second current magnitude being smaller than the first current magnitude.

17. The cordless appliance of claim 16, further comprising means for supplying current from the power supply to the rechargeable battery at a trickle current magnitude after the predetermined time has expired, the trickle current magnitude being smaller than the second current magnitude.

18. The cordless appliance of claim 13, further comprising means for supplying current from the power supply to the rechargeable battery at the second current magnitude for a predetermined period after the counting value has reached said other of the maximum and minimum values regardless of whether the quick charge button has been actuated.

19. A cordless telephone apparatus for use with a charging stand having a power supply, comprising:

a mobile set housing;

a rechargeable battery in the housing, the rechargeable battery being rechargeable by the power supply of the charging stand;

radio communication means in the housing, the radio communication means including a radio receiver and a radio transmitter;

remaining battery amount measuring means, in the housing, for holding a counting value which ranges between a predetermined maximum value and a predetermined minimum value, the counting value being counted toward one of the maximum and minimum values when the radio communication means receives power from the rechargeable battery and being counted toward the other of the maximum and minimum values when the rechargeable battery receives current from the power supply of the charging stand;

a manually operable quick charge button; and means for supplying current from the power supply to the rechargeable battery at a first current magnitude until the counting value reaches said other of the maximum and minimum values if the quick charge button has been actuated and for supplying current from the power supply to the rechargeable battery at a second current magnitude until the counting value reaches said other of the maximum and minimum values if the quick charge button has not been actuated, the counting value being counted toward said other of the maximum and minimum values at a first rate if the quick charge button has been actuated and being counted toward said other of the maximum and minimum values at a second rate if the quick charge button has not been actuated, the first current magnitude and the first rate being larger respectively than the second current magnitude and the second rate.

* * * * *